United States Patent [19]

McQueen

[11] 4,253,795
[45] Mar. 3, 1981

[54] WATER WHEEL WITH LEVEL COMPENSATING BUCKETS

[76] Inventor: Sylvester McQueen, 1405 S. 21st St., Philadelphia, Pa. 19146

[21] Appl. No.: 12,599

[22] Filed: Feb. 16, 1979

[51] Int. Cl.³ ............................................. F01D 7/00
[52] U.S. Cl. .................................. 415/125; 415/129; 74/573 R
[58] Field of Search ............... 415/129, 130, 131, 132, 415/133, 125, 92, 140, 141, 219 R; 416/64, 65, 66, 205, 244 R; 417/436; 74/573 R

[56] References Cited

U.S. PATENT DOCUMENTS

| 181,365 | 8/1876 | Sayre | 415/125 |
| 198,728 | 12/1877 | Gothard | 415/125 |
| 486,754 | 11/1892 | Bouck et al. | 74/573 R |
| 612,554 | 10/1898 | Strauss | 415/125 |
| 678,869 | 7/1901 | Gocher | 415/125 |
| 734,417 | 7/1903 | Hubbell | 74/573 R |

*Primary Examiner*—Stanley N. Gilreath
*Attorney, Agent, or Firm*—Weiser, Stapler & Spivak

[57] ABSTRACT

A water wheel comprising a rotor, having a plurality of buckets longitudinally and tangentially extending about its periphery, and a shaft, which centrally engages the rotor and is rotated by movement of the rotor. The buckets are unitary in construction and are level compensating, remaining essentially perpendicular to the direction of the falling water stream during those periods of time when the buckets are filled with water. The water wheel is mounted on a plurality of standards, having rollers, which are movable on tracks toward or away from the falling water stream. A compensating flywheel is provided to maintain uniform movement during water head variations.

9 Claims, 10 Drawing Figures

WATER WHEEL WITH LEVEL COMPENSATING BUCKETS

BACKGROUND OF THE INVENTION

This invention relates generally to the field of kinetic energy conversion of flowing or falling water into mechanical energy using a water wheel, and particularly to a water wheel of improved construction.

It is known that the kinetic energy of flowing or falling water may be converted into mechanic energy using a water wheel. Such a water wheel generally has a radially extending rotor, the periphery of which is provided with buckets which are capable of catching water, and in this manner, causing rotation of the water wheel in proportion to the water caught and retained by the buckets.

The amount of energy available for conversion is determined by the water head, which is the difference in height or level between the water entering the system, and the water exiting the system. Energy conversion is also determined by the efficiency of the system in catching and retaining moving water therein, to thus maximize the kinetic energy put into the system.

In an "overshot" water wheel system, water enters the system at a point substantially raised from the rotor, and exits the system at a point substantially beneath the rotor. The resulting falling water is caught and retained by the buckets of the water wheel, the weight of the water thereby causing movement of the rotor, giving rise to mechanical energy capable of operating some external device, such as a mill or a generator.

In such a system, the amount of energy converted into mechanical movement, to a large extent, depends upon the amount of water caught and retained in the bucket as the bucket proceeds along its path. Generally a fixed bucket is used, however such a bucket generally permits water contained therein to spill out as the bucket moves away from a position normal to the direction of the water fall. Consequently energy available for conversion is lost.

In addition, water wheels generally are located in a fixed position beneath a water fall, and to turn off such a water wheel, the flow of water to the wheel must be interrupted in some way. This is exceedingly difficult when the water source is a natural water fall of substantial size. Consequently, there arises a need for a water wheel which is capable of movement away from a water fall when not in use, but which can readily be moved into position when use is desired.

In view of the limited energy resources presently available, it becomes necessary to develop a water wheel which is efficient and adaptable to modern energy needs.

SUMMARY OF THE INVENTION

This invention relates generally to the field of kinetic energy conversion of flowing or falling water into mechanical energy using a water wheel, and particularly to a water wheel which is capable of improving the transfer of kinetic energy from falling or moving water to mechanical energy, and which is capable of being moved toward or away from the source of falling or moving water according to need.

A water wheel is provided having a rotor which has tangentially and longitudinally connected thereto a plurality of buckets which are capable of collecting and retaining therein water which is falling or moving past the buckets.

In accordance with the present invention, the transfer of kinetic energy from the moving water to mechanical energy for use in operating an external device is improved in two ways.

First, an improved bucket is provided which is unitary, extending fully across the rotor of the water wheel. In this manner a large fluid catch is provided to retain a maximum amount of fluid therein. The wasted space which inherently presents itself when a series of smaller buckets are used is thus avoided.

Second, a bucket level compensating means is provided, which maintains each bucket essentially perpendicular to the water flow during those portions of time that the bucket is capable of being filled with water. In this manner, the bucket retains water deposited therein as it proceeds around its path. By avoiding the spillage inherent in previous water wheels, the quantity of energy converted from kinetic to mechanical form is increased. The level compensating means is also adapted to release at the point where the water contained in a bucket would ordinarily be emptied, so that the water contained within the bucket may be effectively released. This avoids potential energy losses which would arise should the water be allowed to remain within the bucket along portions of its path where it would normally remain empty.

Further, in accordance with the present invention, the rotor of the water wheel is connected to a shaft which is journalled for rotation within a plurality of standards. These standards are each provided with rollers which engage tracks in a manner which permits the entire assembly to be moved either toward or away from the water source which is to drive the water wheel. Power transfer means are provided to transfer the mechanical energy produced by the water wheel to an apparatus such energy is intended to operate. These power transfer means are also mounted on standards which are capable of movement on the tracks provided, in synchronism with the water wheel.

Also provided are flywheels which are connected to the shaft to which is connected the rotor of the water wheel. These flywheels are utilized to regulate the speed of rotation of the water wheel, to prevent surges caused by irregularities in the energy supplied to the water wheel from placing undue stress on the water wheel system. The flywheels are provided with adjustable weights to regulate the effect of the flywheels on the system.

It is therefore an object of the present invention to provide a water wheel of improved construction.

It is another object of the present invention to provide a water wheel which is capable of improving the rate of conversion of kinetic energy from moving or falling water into mechanical energy, for use in operating an external apparatus.

It is another object of the present invention to provide a water wheel having buckets which maximize the conversion of kinetic energy from moving or falling water into mechanical energy.

It is another object of the present invention to provide a water wheel having a bucket which is maintained perpendicular to the direction of water flow during those periods of time that the bucket would ordinarily be filled with water.

It is another object of the present invention to provide a water wheel having buckets, tangentially connected to the rotor, which extend fully, longitudinally across the rotor.

It is another object of the present invention to provide a water wheel which is capable of movement toward and away from the water source according to need.

It is another object of the present invention to provide a water wheel which is mounted upon, and capable of movement on, a plurality of tracks, toward and away from the water source.

It is another object of the present invention to provide a water wheel having a flywheel capable of regulating movement of the rotor of the water wheel as the energy supplied thereto varies.

It is another object of the present invention to provide a water wheel having a flywheel, capable of regulating movement of the rotor of the water wheel, which is capable of adjustment.

These objects and others will become apparent to those skilled in the art from the following disclosure of the preferred embodiment of the invention taken in conjunction with the drawings provided in which like reference characters refer to similar parts throughout the several views provided, in which:

DESCRIPTION OF THE PREFERRED EMBODIMENT OF THE INVENTION

Although specific terms are used in the following description for the sake of clarity, these terms are intended only to refer to the particular structure of the invention selected for illustration in the drawings and are not intended to define or limit the scope of the invention.

Figure 1:
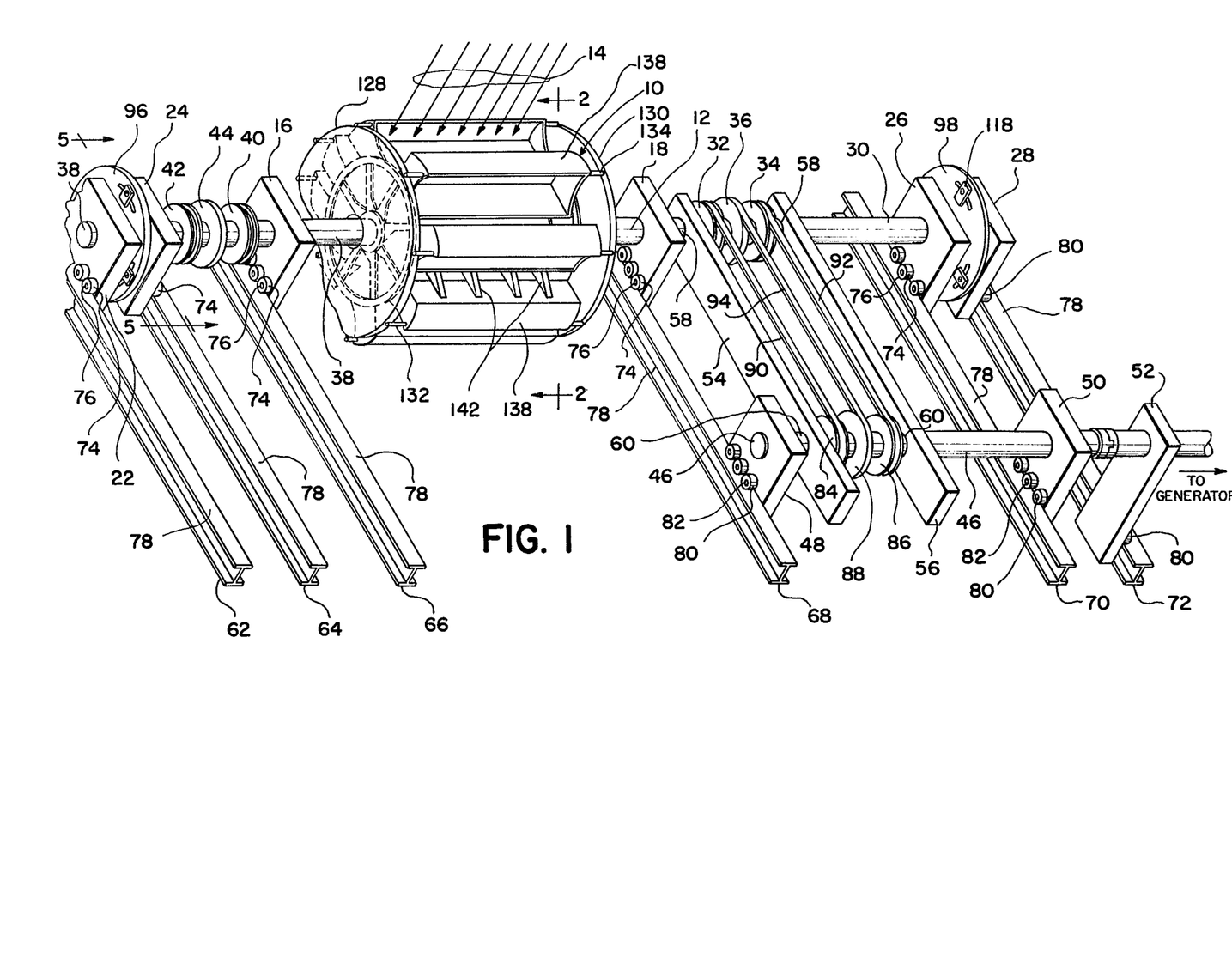
FIG. 1 is a perspective, diagrammatic view of the water wheel and supporting apparatus constructed in accordance with the present invention.

Referring now to the drawings, there is shown in FIG. 1 a water wheel apparatus constructed in accordance with the present invention including generally a rotatively connected rotor 10 which functions to rotate its rotor shaft 12 upon contact with the waterfall 14. The rotor shaft 12, which is rotatively cradled between left and right pillow block bearings 16, 18, extends outwardly therethrough and is endwardly carried by the left pair of pillow block bearings 22, 24 and the right pair of pillow block bearings 26, 28.

Still referring to FIG. 1, the right shaft extension 30 rotatively carries a pair of belt pulleys 32, 34 and an intermediate chain pulley 36 for power transmission of the rotative forces developed by the rotor 10 as hereinafter set forth. Similarly, the left shaft extension 38 can be equipped with a pair of belt pulleys 40, 42 and a chain pulley 44, also for additional power transmission purposes if so desired. As illustrated, an output shaft 46 is rotatively cradled within the bearings 48, 50 and 52 to transmit rotative energy from the shaft extension 30 to a generator (not shown) or other type of rotary power equipment. One or more spacers 54, 56 are provided with endwardly spaced, bearing lined openings 58, 60 to rotatively receive therein respectively the right rotor shaft extension 30 and the power generating shaft 46 to maintain precisely the spacing between the respective rotor and power shafts 12, 46 under all conditions of operation.

A plurality of sturdy, apparatus supporting beams 62, 64, 66, 68, 70, 72 are rigidly secured in place in generally horizontal alignment with supporting structure (not illustrated) of known design as necessary to rigidly secure and anchor the beams to the existing terrain (not illustrated) as may be suitable and required by the exact topography existing at the waterfall 14 by utilizing known construction supporting apparatus, designs and techniques. As illustrated, each of the pillow block bearings 22, 24, 16, 18, 26 and 28 which rotatively support and carry the rotor shaft 12 are provided with a plurality of rollers 74 each of which is rotatively carried upon a roller shaft 76 in a manner to position the rollers 74 upon the respective top surfaces 78 of the supporting beams 62, 64, 66, 68, 70 and 72 to thereby carry the entire weight of the apparatus of the system upon the supporting beams. The plurality of roller shafts 76 are secured to and project from the various pillow block bearings which support the rotor shaft and its extensions. Accordingly, the rotor 10, the rotor shaft 12 and all of the supporting pillow block bearings 22, 24, 16, 18, 26 and 28 can be rendered horizontally movable either toward or away from the waterfall 14 by employing suitable, known mechanisms (not shown) to horizontally move the respective pillow block bearings over the top surfaces 78 of the horizontal beams 62, 64, 66, 68, 70 and 72 at the respective rollers 74 which rotate about the respective roller shafts 76.

Similarly, the output or power shaft 46 is also rendered movable toward or away from the waterfall 14 by employing a plurality of similar rollers 80 which are rotative about their respective roller shafts 82, which shafts are secured in and outwardly project from their respective pillow block bearings 48, 50 and 52. The rollers 80 also rest upon and are in rolling arrangement over the respective top surfaces 78 the support beams 68, 70, 72.

The power generating shaft 46 is provided with a pair of cooperating belt pulleys 84, 86 and an intermediate chain pulley 88, which pulleys are pinned or otherwise affixed to effect shaft rotation. The belt pulleys 84, 86 are similar to the belt pulleys 32, 34 and are rotated through forces transmitted by the respective left and right power transmitting belts 90, 92. The chain pulley 88 is preferably constructed similar to the chain pulley 36 and is pinned or otherwise secured to the power generating 46 to produce rotative power supplied by the interconnecting drive chain 94. Accordingly, as the weight of falling water from the waterfall 14 produces rotative forces in the rotor 10, the rotor affixed shaft 12 acts to also rotate the power output shaft 46 through forces transmitted by the pulley and chain drive combination comprising the respective rotor shaft pulleys 32, 34, 36, the cooperating power output shaft pulleys 84, 86, 88 and interconnecting respective belts and chains 90, 92 and 94.

As above set forth, the entire apparatus is movable along the top surfaces 78 of the respective supporting beams using external forces and apparatus (not illustrated) which may be of conventional design and form no part of the present invention. As the respective rotor shaft 12 and power output shaft 46 are moved horizontally along the top surfaces 78 of the supporting beams, the spacers 54, 56 serve to maintain the orientation of the parts under all positions of use.

The left rotor shaft extension 38 is similarly equipped with belt pulleys 40, 42 and chain pulley 44 to similarly function an additional power output shaft (not illustrated) if desired in a manner similar to that illustrated in conjunction with the right rotor shaft extension 30 and the power output shaft 46. A left balance wheel 96 is securely keyed, splined or otherwise affixed to the left rotor shaft extension 38 to be rotated by the rotor 10. The left balance wheel 96 is cradled between the left pair of pillow block bearings 22, 24 as illustrated and is rendered dynamically adjustable in the manner hereinafter more fully set forth. Similarly, a right balance wheel 98 is secured to the right rotor shaft extension 30 and is cradled between the right pair of pillow block bearings 26, 28 for simultaneous rotation when the rotor 10 is rotated. The right balance wheel 98 is also equipped with adjustable weights as hereinafter more fully set forth.

Figure 2:
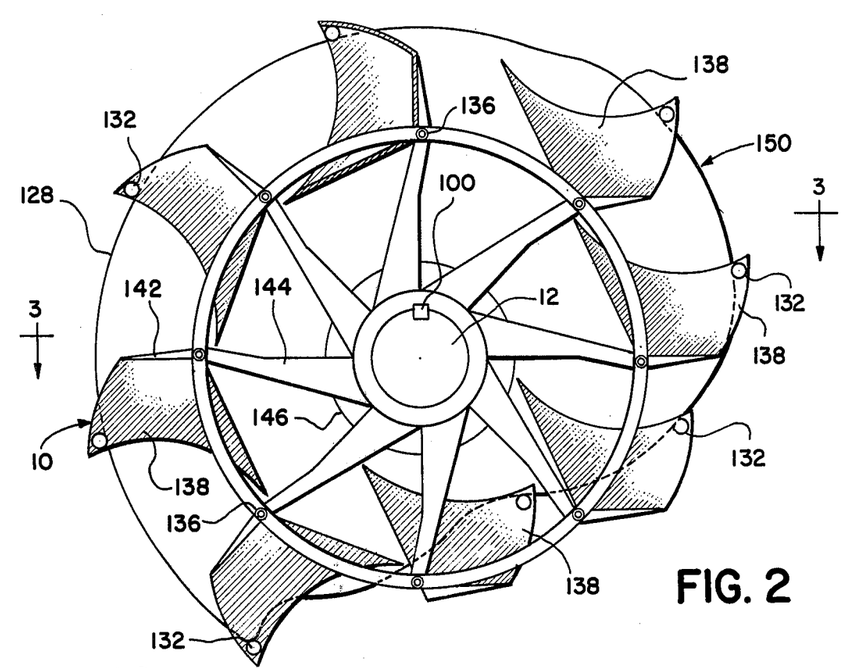
FIG. 2 is an enlarged, side elevational view of the rotor, looking from line 2—2 on FIG. 1.
Figure 3:
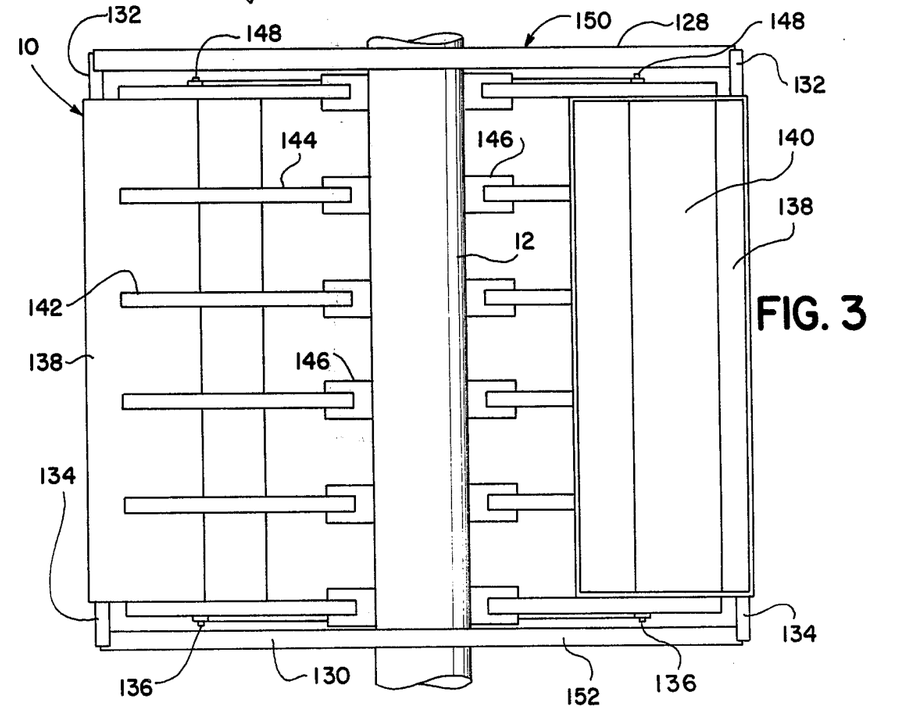
FIG. 3 is a cross-sectional view taken along line 3—3 of FIG. 2, looking in the direction of the arrows.

Referring now to FIGS. 2 and 3, it will be noted that the rotor 10 is secured to the rotor shaft 12 in any suitable, secure manner, for example by utilizing a key 100 to cause shaft rotation when the rotor 10 is rotated by the weight of the water in the waterfall 14.

A plurality of rotor blades or buckets 138 are respectively carried upon a plurality of support arms 144, which arms are secured to the rotor shaft 12 by respective collars or connector means 146. The buckets 138 comprise an open water carrying interior 140 which is defined by the closed bottom. As the buckets are filled by the water from the fall 14, the weight of the water, acting through the support arm 144 and the connector means 146 effects rotation of the rotor shaft 12.

Figure 4:
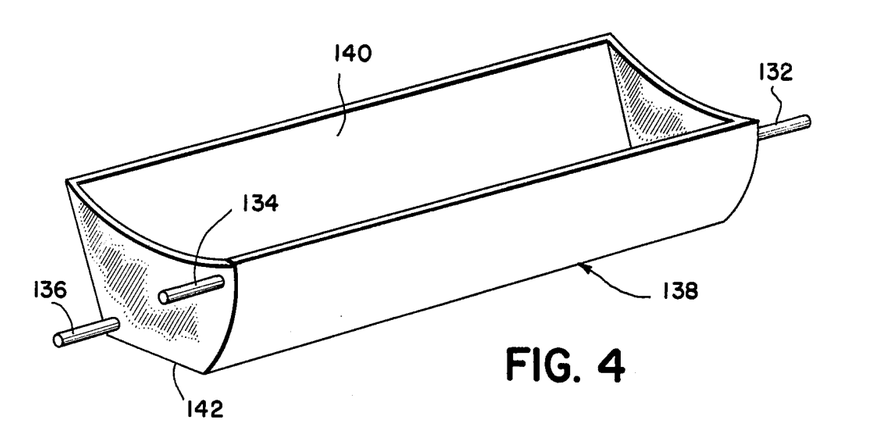
FIG. 4 is an enlarged, perspective view of one of the rotor buckets.

Still referring to FIGS. 2 and 3, it will be noted that the rotor assembly 10 comprises a plurality of equally peripherally spaced buckets 138 and a pair of endwardly positioned, stationary nonrotative cams 128, 130. Each bucket includes a pair of outwardly extending follower arms 132, 134 and a pair of outwardly extending pivot arms 136, 148 (FIG. 4). The follower arms 132, 134 may include roller followers (not illustrated) and are designed to cooperate with the curved cam surfaces 150, 152 to effect levelling and dumping of each bucket 138 as the rotor 10 rotates the shaft 12. As illustrated, it will be noted that the buckets 138 are pivoted about the pivot arms 136, 148 by the interaction of the follower arms 132, 134 upon the cam surfaces 150, 152 between a dumping mode as indicated on the left side of FIG. 2 and a water carrying mode as indicated on the right side of FIG. 2.

The cam surfaces are configured and designed to maintain the individual buckets in a substantially level, water carrying position through almost one hundered and eighty degrees to maximize the rotative effect caused by the weight of the water. As a bucket approaches its lowest rotative position of travel, the cam surfaces 150, 152 function with the follower arms 132, 134 to rotate the bucket about its pivot arms 136 to thus dump the carried water. As the buckets are carried from their lowest positions to their highest positions of rotative travel, the cam surfaces and cam followers 150, 152 and 132, 134 cooperate to maintain the respective bucket bottoms 142 upwardly to thus prevent carrying any water during the upward portion of the circle of travel.

Figure 5:
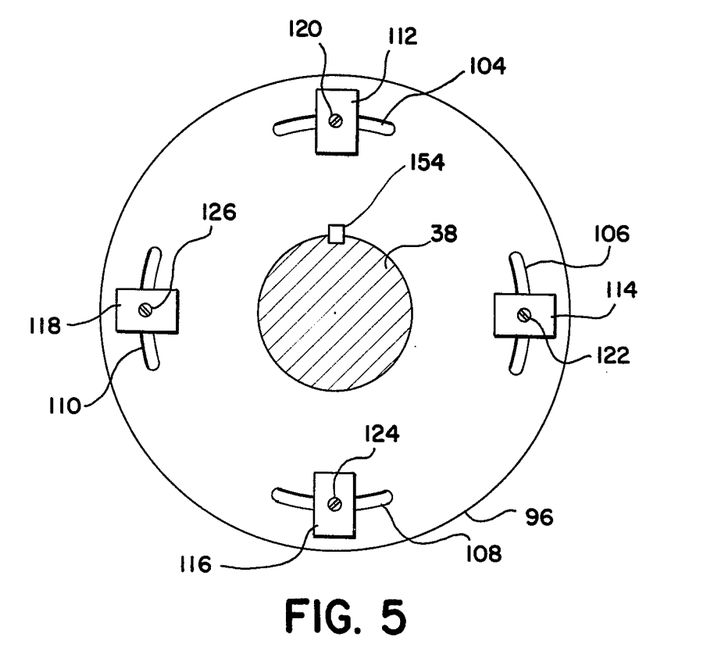
FIG. 5 is an enlarged, side elevational of the balance flywheel, looking from line 5—5 on FIG. 1.

Referring now to FIGS. 1 and 5, left and right balance wheels 96, 98 are illustrated. Each balance wheel comprises a plurality of peripherally spaced adjusting weights 112, 114, 116, 118, which can be individually moved or adjusted relative to their respective arcuate slots 104, 106, 108, 110 to provide means to dynamicly balance the system. Each weight 112, 114, 116, 118 is equipped with a suitable pin 120, 122, 124, 126 which pins respectively ride within the arcuate slots 104, 106, 108, 110. The pins 120, 122, 124, 126, include tightening means (not shown) of known design to facilitate locking each weight in a suitable position within its associated arcuate slot 104, 106, 108, 110 to balance the system.

Referring now to FIGS. 6–10, another embodiment 160 of the rotor and bucket arrangement will now be described. In this embodiment, the shaft 162 is rotatively arranged within the left and right bearings 164, 166 to be rotated by the weight of the falling water 14. A suitable structural frame 168 carries the bearings 164, 166 and preferably is movable relative to the position of the water fall in the manner hereinbefore described. Left and right cams 170, 172 mount upon the frame 168 to pivot the plurality of buckets 174 as the rotor assembly is rotatively urged.

Figure 6:
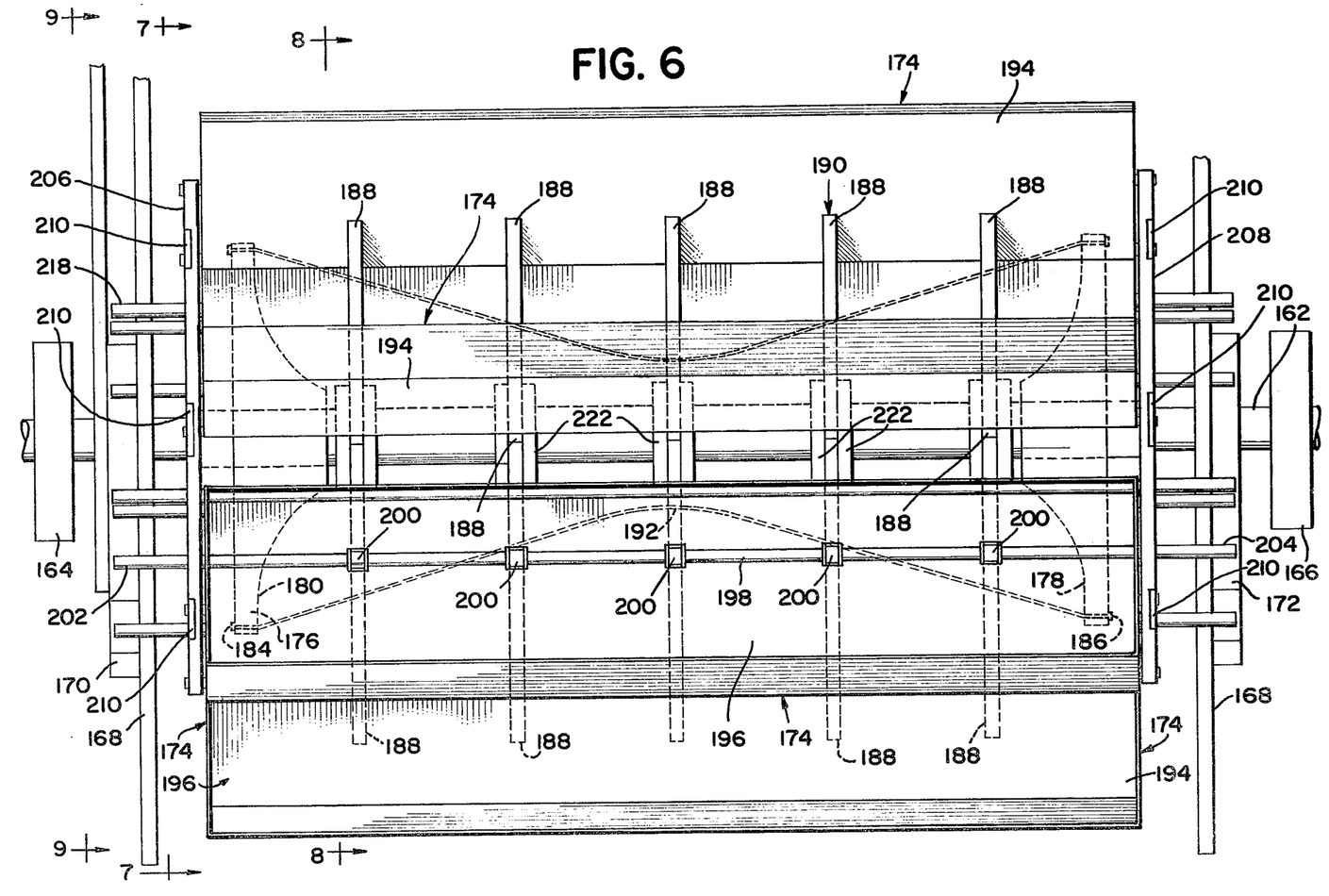
FIG. 6 is a cross-sectional view similar to FIG. 3, showing another embodiment of the invention.
Figure 7:
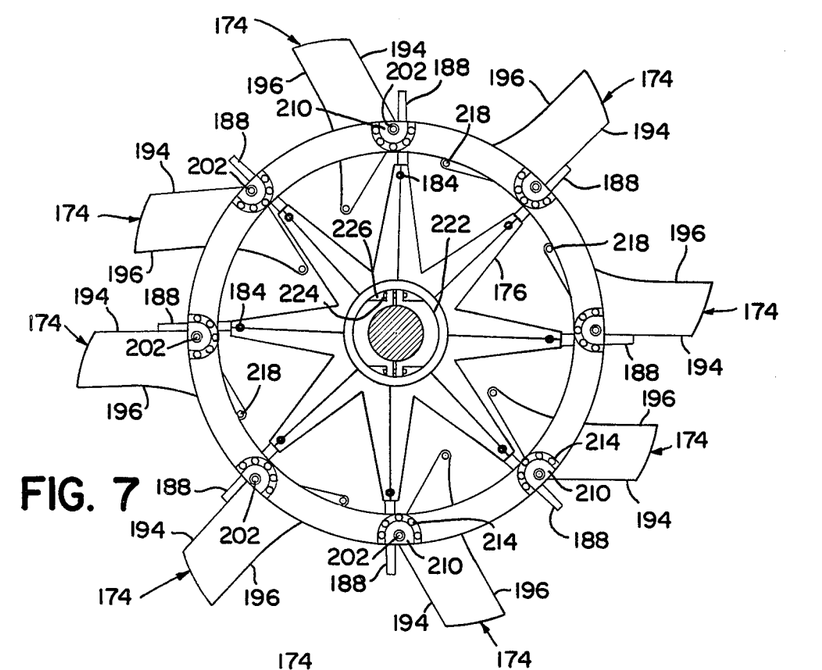
FIG. 7 is a cross-sectional view taken along line 7—7 on FIG. 6.

As best seen in FIGS. 6 and 7, a pair of spaced, star-shaped brackets 176, 178 are endwardly affixed on the shaft 162 and are secured thereto for rotation as the shaft is rotated. The brackets each comprise a plurality of radially extending arms or points 180 which serve to secure the respective left and right ends 184, 186 of a plurality of supporting cables or ties 182.

Figure 8:
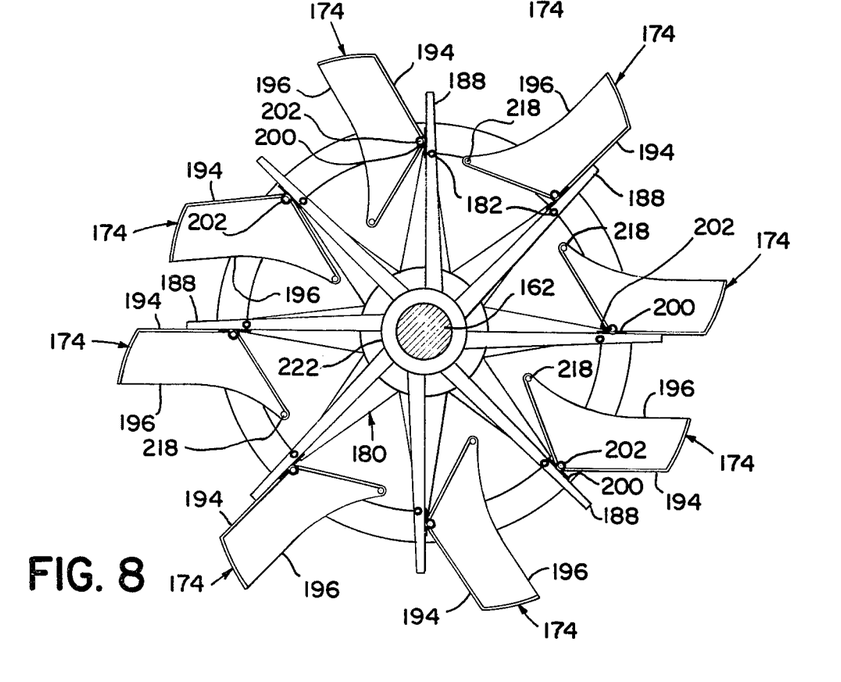
FIG. 8 is a cross-sectional view taken along line 8—8 on FIG. 6.

Referring now to FIGS. 6 and 8, it will be seen that a plurality of bucket support arms 188 project generally radially outwardly from the shaft 162 to carry the plurality of buckets 174 in a manner to permit each bucket to pivot for maximum water carrying purposes as the device is rotated by the weight of the falling water 14. In the embodiment illustrated, a plurality of eight support arms 188 are provided at each station 190, one such arm being provided for each bucket 174 employed in the system. A sufficient number of arm stations 190 are spaced along the shaft 162 between the end brackets 176, 178 as will be necessary to support adequately the plurality of buckets 174 without undue deflection to facilitate the function of the system. Each arm 188 is provided with an opening 192 through which the support cables 182 can pass for arm support purposes. As best seen in FIG. 6, the openings 192 are positioned in the respective arms 188 comprising the plurality of support arm stations 190 to define substantially parabolic curves as the cables 182 are threaded through the openings 192 between the left and right support brackets 176, 178. The arm stations include split rings 222 to secure the plurality of arms 188 in a removable manner, such as by employing bolts 224 secured in recesses 226.

Figure 9:
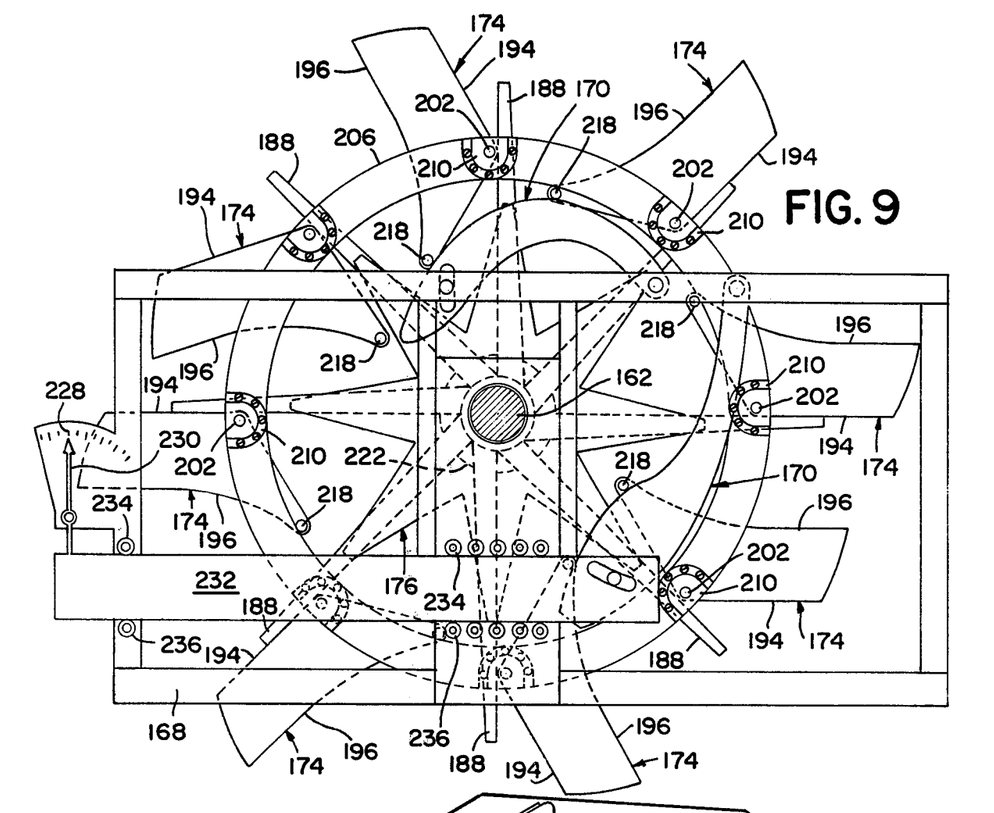
FIG. 9 is an end elevational view of the embodiment of FIG. 6.
Figure 10:
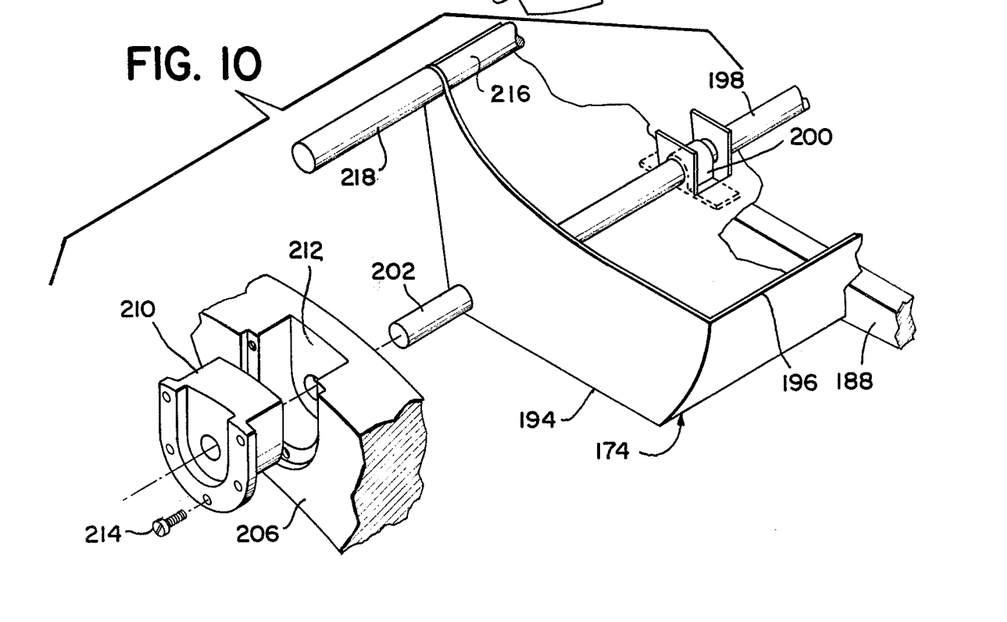
FIG. 10 is an enlarged, partial, exploded view of the bucket bearing construction.

As illustrated in FIGS. 9 and 10, each bucket 174 is formed with a closed bottom 194 and an open top 196. A pivot shaft 198 is inwardly carried in each bucket 174 in suitable bearings 200 to enable the individual buckets to pivot about their respective shafts 198. The pivot shafts outwardly extend and terminate in left and right shaft extensions 202,204. Left and right ring supports 206, 208 rotatively carry the plurality of bucket pivot shafts 198 within respective wheel locks 210. The wheel locks may be secured within recesses 212 provided in the ring supports 206, 208 at arcuately spaced intervals by employing conventional threaded fasteners, such as bolts 214.

Each bucket 174 extends upwardly and is affixed to a cam arm 216 for bucket pivoting purposes. Each cam arm 216 terminates laterally in a left extension 218 and in a similar right extension, which extensions act as followers to contact the respective left and right cams 170, 172. As best seen in FIGS. 6 and 9, the left and right cams are correspondingly formed and are suitably shaped to guide or pivot the buckets 174 about their respective pivot shafts to maximize the amount of water the buckets can carry during their downward, water carrying paths, without spilling. Thus, as the water 14 fills each bucket 174, the weight of the water causes rotation of the apparatus to rotate the shaft 162. The interaction of the respective followers or arm extensions 218, 220 with the left and right cams 170, 172 causes each bucket 174 to rotate about its pivot shaft 198 to maintain the open top 196 substantially horizontal and level during the down portion of rotation to maximize the weight of water retained without spilling. At the bottom of the rotative cycle, the cams 170, 172 act to pivot each bucket 174 to a dumping position to therefore not impede upward rotation of each bucket.

If desired, as illustrated in FIG. 9, an indicator scale 228 can be provided in conjunction with the frame 168 to determine the actual weight of water carried within the buckets 174. The indicator 230 is movable relative to the scale 228 upon a horizontally sliding carriage 232 for scale activation purposes. The carriage 232 is movable between a plurality of upper and lower rollers 234, 236 in suitable manner by suitable known means (not shown) such as a motor and hoist arrangement to facilitate scale reading when so desired.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. In a rotary power system of the type comprising a rotor adapted to receive falling water to cause rotor rotation, a rotor shaft connected to the rotor and being rotated thereby, a plurality of bearings rotatively carrying the rotor shaft and a power generating shaft receiving rotative power from the rotor shaft, the improvement comprising means to horizontally move the rotor, the rotor shaft and the bearings relative to the said falling water, the means to horizontally move comprising a plurality of fixed beams secured in generally horizontal alignment;

the bearings comprising rollers, the said rollers being in rolling contact with the beams to facilitate horizontal movement of the bearings relative to the beams;

a spacer interconnected between the rotor shaft and the power generating shaft to maintain the spacing between the respective shafts;

a bearing interposed between the rotor shaft and the spacer whereby the rotor shaft can rotate freely of the spacer and a bearing interposed between the power generating shaft and the spacer whereby the power generating shaft can rotate freely of the spacer;

the rotor comprising a plurality of water receiving buckets and means to maintain some of the buckets in horizontal alignment as the rotor is rotated by the water;

the means to maintain comprising a cam positioned adjacent to the rotor and a follower extending from a bucket whereby the trace of the cam as subscribed by the follower pivots the bucket continuously to horizontal alignment as the rotor rotates.

2. The system of claim 1 wherein the cam and follower are adapted to maintain the horizontal alignment of the bucket through substantially one hundred and eighty degrees of rotor rotation.

3. The system of claim 1 and a balance wheel affixed to the rotor shaft outwardly from the rotor, the balance wheel comprising a movable weight.

4. The system of claim 3 wherein the balance wheel is formed to provide an arcuate slot, the weight being movable relative to the balance wheel along the arcuate slot.

5. The system of claim 4 wherein the weight includes a lockable pin, the pin being positioned within the arcuate slot whereby the weight can be locked in a desired peripheral position along the slot.

6. In a rotary power system of the type comprising a bucket carrying rotor adapted to receive falling water to cause rotor rotation, a rotor shaft connected to the rotor and being rotated thereby, the improvement comprising frame means to carry the rotor in rotary engagement;

means to pivot the bucket relative to the frame to increase the water carrying capacity of the bucket;

a plurality of bucket support arms spaced along the rotor shaft, the support arms being adapted to support the bucket without deflection; and left and right brackets respectively affixed to the rotor shaft endwardly of the support arms and tensioning means extending between the left and right brackets to strengthen the support arms.

7. The rotary power system of claim 6 wherein the tensioning means comprises a support cable secured at its ends to the left and right brackets.

8. The rotary power system of claim 6 wherein the tensioning means extends through at least some of the support arms.

9. The rotary power system of claim 7 wherein the cable is retained in the configuration of a parabola.

* * * * *